Oct. 9, 1945.    A. G. BROWN    2,386,539
ROTARY MOTOR
Filed Nov. 9, 1943    2 Sheets-Sheet 1
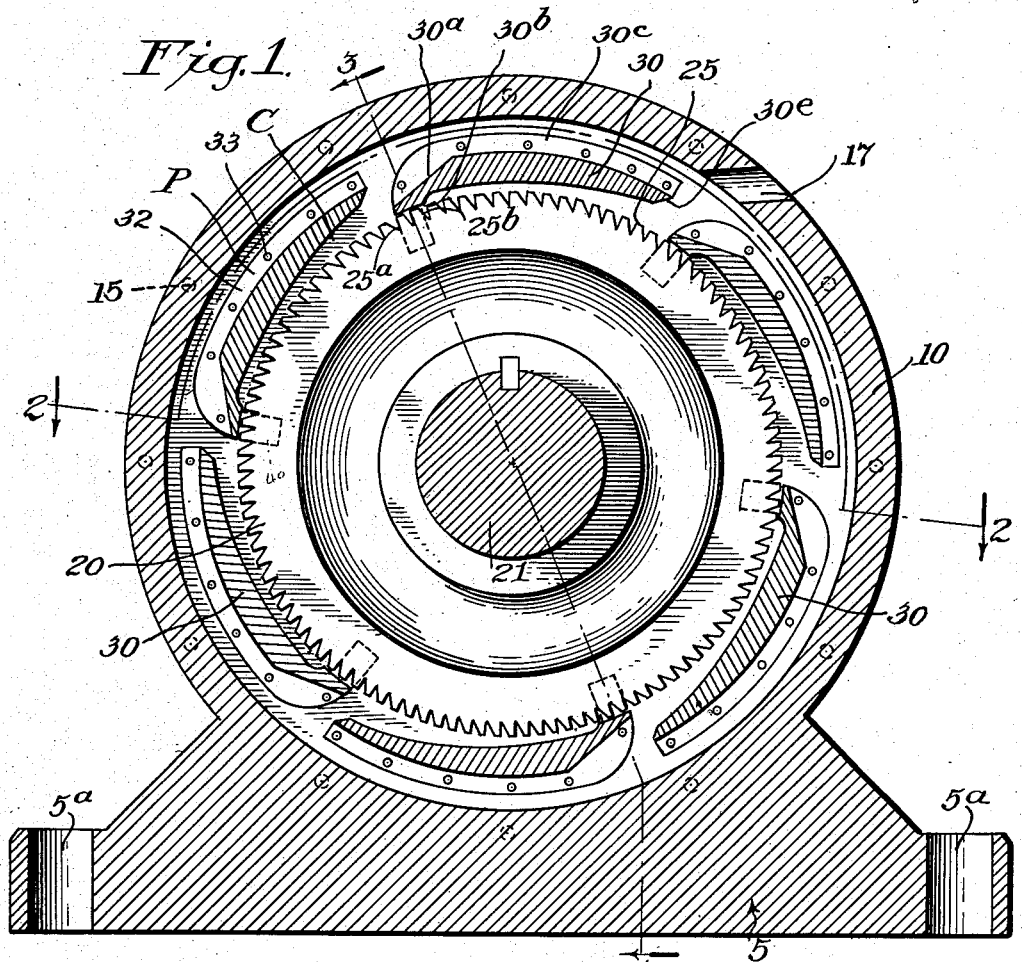
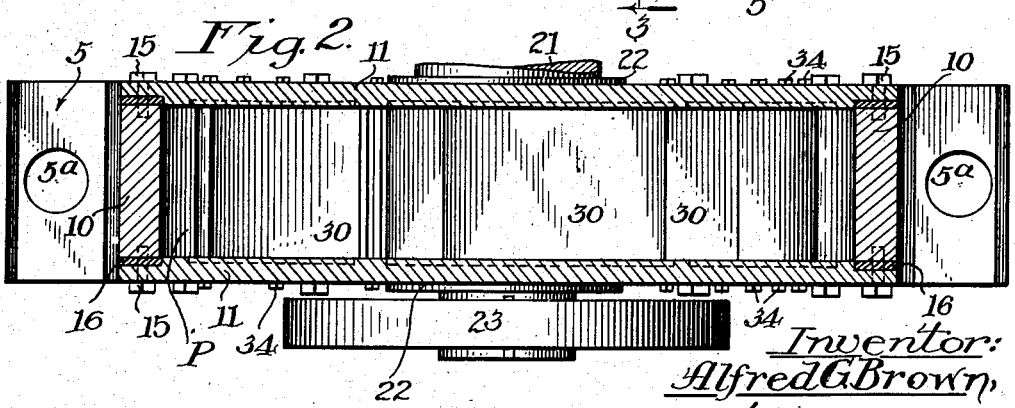
Inventor:
Alfred G. Brown, Oct. 9, 1945.  A. G. BROWN  2,386,539
ROTARY MOTOR
Filed Nov. 9, 1943  2 Sheets-Sheet 2
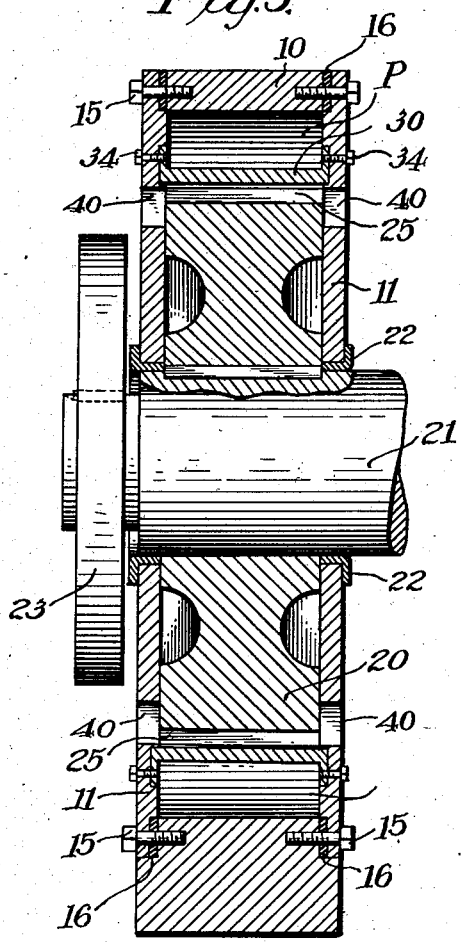
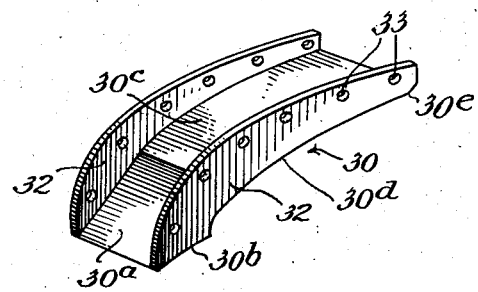
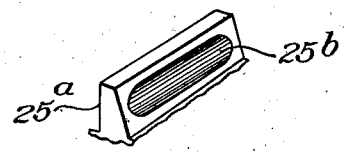
Inventor:
Alfred G. Brown,
By Patented Oct. 9, 1945

2,386,539

UNITED STATES PATENT OFFICE 2,386,539

ROTARY MOTOR

Alfred G. Brown, Los Angeles, Calif., assignor of one-half to L. T. Sepin, Los Angeles County, Calif.

Application November 9, 1943, Serial No. 509,578

10 Claims. (Cl. 253—50)

My invention has to do with motors of the rotary or turbine type and, more particularly, my improvements relate to a motor peculiarly adapted to be actuated by $CO_2$ gas, although it will be understood that the invention contemplates the use of other fluids.

It is among the principal aims of the invention to provide a motor having a minimum of movable parts, which embodies maximum simplicity of construction, is economical of manufacture, and one in which it is possible to attain maximum efficiency from an expansible gas-actuating agent.

It is also among the objects of my invention to provide novel feed and exhaust means as well as advantageous vane construction and arrangement.

Still further advantages are inherent in the invention and how those as well as the objects hereinabove particularly pointed out are achieved will become apparent from the following detailed description of one example of structure in which the invention is embodied, for the purposes of which description I shall refer to the accompanying drawings, in which:

Fig. 1 is a vertical section;

Fig. 2 is a plan section taken on line 2—2 of Fig. 1;

Fig. 3 is a section on line 3—3 of Fig. 1;

Fig. 4 is a perspective of a part of the motor; and

Fig. 5 is an enlarged perspective of one of the vanes of the rotor.

The embodiment of the invention shown in the drawings includes a base 5 which has suitable means for being secured to a foundation, such means being here shown as bolt-passing holes 5a.

Formed integrally with the base, I provide a cylindric casing 10 to which end plates 11 are secured as by cap screws 15, annular packing rings 16 being interposed between the casing 10 and plates 15 to render the device fluid tight.

An inlet port 17 opens tangentially into the casing. The inlet end of the port typically may be connected to a source of $CO_2$ gas such as that shown in my copending application Serial No. 482,400, filed April 9, 1943.

A rotor 20 is secured on a shaft 21, the shaft being journaled in the bearings 22 carried by the end plates and carries a fly-wheel 23 exterior of the casing.

The rotor presents peripheral vanes or teeth 25 which have relatively straight front faces 25a facing the direction of rotation and concaved annularly disposed rear or power faces 25b, so that a substantially greater area is presented by the rear face than the front face of each vane.

Secured to the end plates 11 and spaced apart circumferentially of the rotor periphery, I provide a series of stationary fluid-directing vanes or segments 30, here shown as six in number, although this number may be varied. One of these segments is shown in perspective in Fig. 4, and each one has a beveled inner end 30a, a bottom end surface 30b which is slightly curved in section so as to be disposed as closely as possible to the rotor periphery without contacting the vanes, the radius of said curvature being substantially that of the rotor periphery. The segments 30 each have an outer surface 30c curved in consonance with the curvature of the casing 10 so as to provide an annular gas passageway P therebetween, and the under surface 30d of each segment tapers to a relatively narrow outer beveled end 30e. The gradually narrowing space between the under surface 30d of each segment and the periphery of the rotor provides a compression chamber C. Each segment 30 has opposite side flanges 32 with threaded openings 33 to permit attachment of the segments to the end walls 11 by means of screws 34.

A pair of oppositely disposed outlet ports 40 are provided through the end walls 11, each pair of ports effectively communicating with the interior of the casing only as the space between each adjacent pair of vanes 25 is rotated to a position beneath the surface 30b of the segment 30. Of course, there is some slight continuous communication inasmuch as surface 30b cannot be in contact with the adjacent ends of the vanes. These ports discharge into atmosphere or to a gas-collecting reservoir, not shown. In the event they discharge into such a reservoir, however, it is desirable that the pressure within the reservoir be relatively low so as to permit free exhaust.

In operation the $CO_2$ gas or other expansible fluid enters through port 17 into passageway P. It then enters the respective chambers C wherein it exerts great pressure on the vanes 25 by virtue of its expansion, the compression being progressively greater in the counter-clockwise direction of rotation of the rotor. Although this pressure may be exerted both on the front and rear faces of the vanes 25, the rotor is caused to rotate by virtue of the relatively greater area and disposition of the faces 25a of the vanes, the disposition of segments 30, chambers C and the arrangement of the exhaust ports.

While, in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. A motor of the class described comprising a closed cylindric casing having an inlet port adapted to discharge fluid under pressure tangentially into the casing, a rotor journaled for rotation in the casing, circumferentially spaced vanes on the periphery of the rotor providing channels therebetween, the surface area of the face of the respective vanes towards the direction of rotation being relatively less than the surface area of the opposite surface, a stationary member in the cylinder closely overlying only a portion of the periphery of the rotor and an exhaust port communicating with the casing only through the channels between the vanes rotated into position underlying said stationary member.

2. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the rear faces of said vanes presenting a relatively greater surface area than the front faces thereof, circumferentially spaced stationary members disposed longitudinally of the casing in position closely overlying the periphery of the rotor, and circumferentially spaced exhaust ports communicating with the channels underlying said stationary members.

3. A turbine comprising a cylindric casing having end walls, a rotor journaled for rotation coaxially in the casing, peripheral transverse vanes on the rotor, said vanes being circumferentially spaced apart whereby to provide channels therebetween, circumferentially spaced segments secured to the end walls around the periphery of the rotor and spaced from the side wall to provide an annular passageway therebetween, the inner end of each segment being disposed closely adjacent the periphery of the rotor whereby to cover the channel between adjacent teeth passing thereunder and tapering to its outer end to provide a compression chamber between its under surface and the periphery of the rotor, a fluid inlet discharging tangentially into the annular passageway, and exhaust ports through the side wall, one communicating with the casing under the inner end of each segment whereby to exhaust fluid from the respective channels as the rotor rotates relative to the casing.

4. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the rear faces of said vanes being convexed and presenting a relatively greater surface area than the front faces thereof, circumferentially spaced stationary members disposed longitudinally of the casing in position closely overlying the periphery of the rotor, and circumferentially spaced exhaust ports communicating with the channels underlying said stationary members.

5. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the rear faces of said vanes being angularly disposed and presenting a relatively greater surface area than the front faces thereof, circumferentially spaced stationary members disposed longitudinally of the casing in position closely overlying the periphery of the rotor, and circumferentially spaced exhaust ports communicating with the channels underlying said stationary members.

6. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the front faces of the vanes toward the direction of rotation of the rotor being straight and disposed diametrically of the rotor and the rear faces being angular and convexed whereby to present a power-applying area greater than the area of the front faces, circumferentially spaced stationary members disposed longitudinally of the casing in position closely overlying the periphery of the rotor, and circumferentially spaced exhaust ports communicating with the channels underlying said stationary members.

7. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the rear faces of said vanes presenting a relatively greater surface area than the front faces thereof, circumferentially spaced stationary members disposed longitudinally of the casing in position closely overlying the periphery of the rotor, each of the said members having an inner end closely overlying the outer ends of the vanes thereunder whereby to substantially close the top of the channel provided between adjacent teeth thereunder, and exhaust ports, one extending through an end wall adjacent the inner end of each stationary member whereby to be placed in communication with said channels as they are successively moved into position underlying said inner ends by virtue of application of power to the rear faces of the vanes.

8. A motor of the class described comprising, in combination, a closed cylindric casing having end walls, a rotor in the casing, said rotor being journaled for rotation axially of the casing, an inlet port opening tangentially into the casing, said port being adapted to discharge a fluid into the cylinder under pressure, peripheral vanes on the rotor presenting longitudinal channels therebetween, the rear faces of said vanes presenting a relatively greater surface area than the front faces thereof, circumferentially spaced stationary members disposed longitudinally of the casing in position closely overlying the periphery of the rotor, each of the said members having an inner end closely overlying the outer ends of the vanes thereunder whereby to substantially close the top of the channel provided between adjacent teeth thereunder, and exhaust ports, one extending through each end wall adjacent the inner end of each stationary member whereby to be placed in communication with said channels as they are successively moved into position underlying said inner ends by virtue of application of power to the rear faces of the vanes.

9. A turbine comprising a cylindric casing having end walls, a rotor journaled for rotation coaxially in the casing, peripheral transverse vanes on the rotor, said vanes being circumferentially spaced apart whereby to provide channels therebetween, circumferentially spaced segments secured to the end walls around the periphery of the rotor and spaced from the side wall to provide an annular passageway therebetween, the inner end of each segment being disposed closely adjacent the periphery of the rotor whereby to cover the channel between adjacent teeth passing thereunder and tapering to its outer end to provide a compression chamber between its under surface and the periphery of the rotor, said respective compression chambers communicating with the annular passageway between adjacent ends of adjacent segments and being of gradually decreasing area in the direction of rotation of the rotor, a fluid inlet discharging tangentially into the annular passageway, and exhaust ports through the side wall, one communicating with the casing under the inner end of each segment whereby to exhaust fluid from the respective channels as the rotor rotates relative to the casing.

10. A motor of the class described comprising a closed cylindric casing having an inlet port adapted to discharge fluid under pressure into the casing, a rotor journaled for rotation in the casing, circumferentially spaced vanes on the periphery of the rotor providing channels therebetween, the surface area of the face of the respective vanes towards the direction of rotation being relatively less than the surface area of the opposite surface, means disposed between the side wall of the casing and the vanes providing a compression chamber in communication with the vanes, and means responsive to rotation of the rotor to exhaust fluid from the chamber.

ALFRED G. BROWN.